(12) United States Patent
Modica

(10) Patent No.: US 7,772,452 B2
(45) Date of Patent: Aug. 10, 2010

(54) PROCESS FOR RECOVERY OF THE SILICA PRESENT IN THE SEPARATORS BETWEEN THE ELEMENTS OF LEAD-ACID BATTERIES

(75) Inventor: Giovanni Modica, Milan (IT)

(73) Assignee: Millbrook Lead Recycling Technologies Limited, Dublin (IE)

( * ) Notice: Subject to any disclaimer, the term of this patent is extended or adjusted under 35 U.S.C. 154(b) by 783 days.

(21) Appl. No.: 10/589,282

(22) PCT Filed: Feb. 3, 2005

(86) PCT No.: PCT/IB2005/000291

§ 371 (c)(1),
(2), (4) Date: Apr. 18, 2007

(87) PCT Pub. No.: WO2005/081356

PCT Pub. Date: Sep. 1, 2005

(65) Prior Publication Data

US 2007/0280871 A1    Dec. 6, 2007

(30) Foreign Application Priority Data

Feb. 11, 2004  (CH) .................................... 0196/04

(51) Int. Cl.
*A62D 3/30* (2007.01)
*A62D 3/40* (2007.01)
*C01B 33/12* (2006.01)
*H01M 6/50* (2006.01)
*H01M 10/42* (2006.01)

(52) U.S. Cl. .................. 588/321; 588/313; 588/320; 588/400; 588/410; 588/411; 423/335; 429/49

(58) Field of Classification Search ............... 75/10.16, 75/420, 423, 695, 725; 423/335–339; 429/49; 588/301–400

See application file for complete search history.

(56) References Cited

FOREIGN PATENT DOCUMENTS

CH        681 401 A5    3/1993

OTHER PUBLICATIONS

"Recycling of epoxy resin compounds for moulding electronic components" Iji et al., *Journal of Materials Science* vol. 33 No. 1 (1998), pp. 45-53.
"Lead recovery from a typical Brazilian sludge of exhausted lead-acid batteries using an electrohydrometallurgical process" Ferracin et al., *Hydrometallurgy* vol. 65 No. 2-3, (2002) pp. 137-144.

*Primary Examiner*—Jerry Lorengo
*Assistant Examiner*—Jennifer A Smith
(74) *Attorney, Agent, or Firm*—Connolly Bove Lodge & Hutz LLP

(57) ABSTRACT

A process for recovery of the silica present in the separators located between the elements of lead-acid batteries characterized in that it comprises the following operations: a) washing the heavy plastics to remove the lead compounds and other foreign bodies, b) separating the plastics from the washing solution, c) lead recovery and regeneration of the washing solution, d) rinsing of the plastics, e) drying of the plastics, f) separation of the granular plastics from the thin plastics (polyethylene with silica filler, PVC, fabrics) by drawing them up in a flow of air making use of the shape effect, g) separation of the PVC and fabrics from the polyethylene with silica filler through fragmentation, h) pyrolysis of the polyethylene with silica filler, i) cracking of the pyrolysis gases and vapours in order to reduce their molecular weight and render them more suitable for handling and combustion to provide the heat necessary for pyrolysis, j) oxidation of the pyrolysis residue to remove carbonaceous residues and recover the silica, k) pyrolysis of the mixture of PVC and fabrics presence of alkaline substances, l) oxidation of the residue from the pyrolysis of PVC and fabrics with the production of inert ashes is described.

20 Claims, 1 Drawing Sheet

Figure 1:
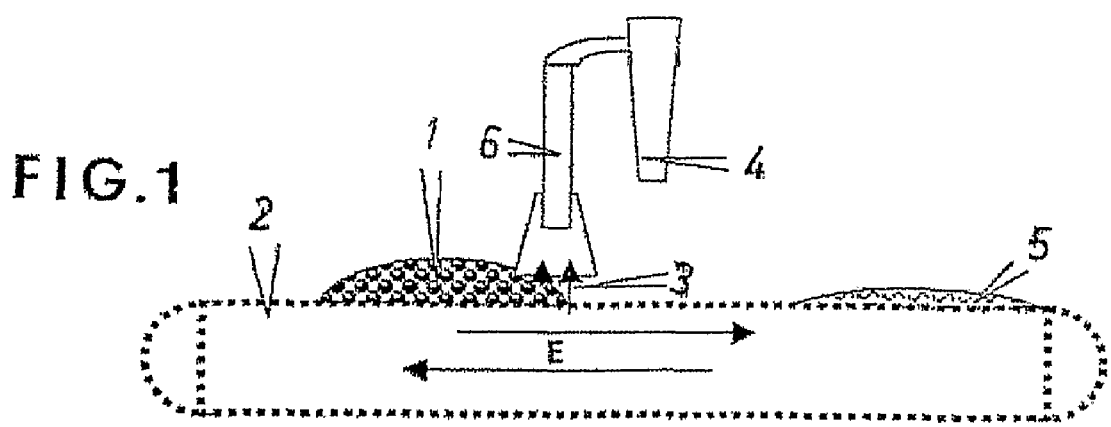

PROCESS FOR RECOVERY OF THE SILICA PRESENT IN THE SEPARATORS BETWEEN THE ELEMENTS OF LEAD-ACID BATTERIES

This application is a National Stage of PCT/IB2005/000291 filed Feb. 3, 2005 which in turn claims priority from Swiss Application 00196/04, filed Feb. 11, 2004.

This invention relates to the field of industrial chemistry, and more specifically the sector thereof concerned with the recovery of silica present in the diaphragms acting as separators between the elements of batteries of the lead-acid type using processes of different kinds. In particular, as will be illustrated below, the invention relates to an innovative process for obtaining the abovementioned recovery of silica.

At present more than 60% of lead produced comes from the recycling of spent lead-acid batteries. Batteries at the end of their lives are broken up and the following fractions are separated using physical methods: electrode pastes, (paste) mixture of PbO, $PbO_2$, $PbSO_4$; metal part (terminals, connections, grids); light plastics (ethylene-propylene copolymers), heavy plastics (polyethylene with silica filler, ABS, SAN, PVC, polycarbonate, polyethylene-propylene with quartz filler, polyester and glass fabrics), and sulphuric acid. The various separated fractions are subjected to chemical and physical operations to recover and recycle the materials present in them. Lead is recovered either from the paste or from the metal part. The fraction of light plastics, approximately 65% of the total, is separated out because it floats in water and is recycled as such to the secondary raw materials market. The remaining fraction of plastics, the remaining 35%, does not float in water and comprises a very complex mixture of plastics materials comprising approximately 60% from the separators based on polyethylene with microporous silica filler located between the electrode plates. Thin sheets of PVC and fabrics based on polyester are also present in this fraction as separators, while the other plastics materials (for example ABS, SAN, PS, PP-PE with fillers and colouring agents) derive from the braking up of the external containers. There is also an appreciable quantity of lead metal and its compounds (approximately 8% by weight) present and physically mixed or adhering to the plastics during the breaking operation. This mixture is dumped directly because owing to the presence of PVC and lead compounds it is classified as a hazardous waste. The cost of disposing of this mixture has an appreciable effect, approximately 1%, on the cost of lead recovery.

The inventor of the process according to the invention has conceived a new process which makes it possible to recover the quality microporous silica present in the polyethylene separators located between the electrodes, some types of valuable plastics present in the mixture of heavy plastics materials and to generate a sufficient quantity of energy to make the silica recovery process self-sustaining.

The object of the invention therefore comprises a process for the recovery of silica as described in appended claim 1.

Figure 2:
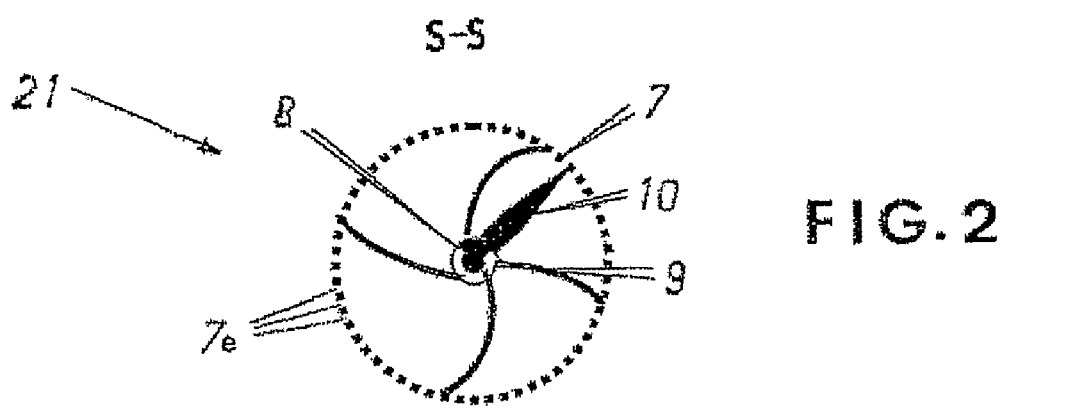
Figure 3:
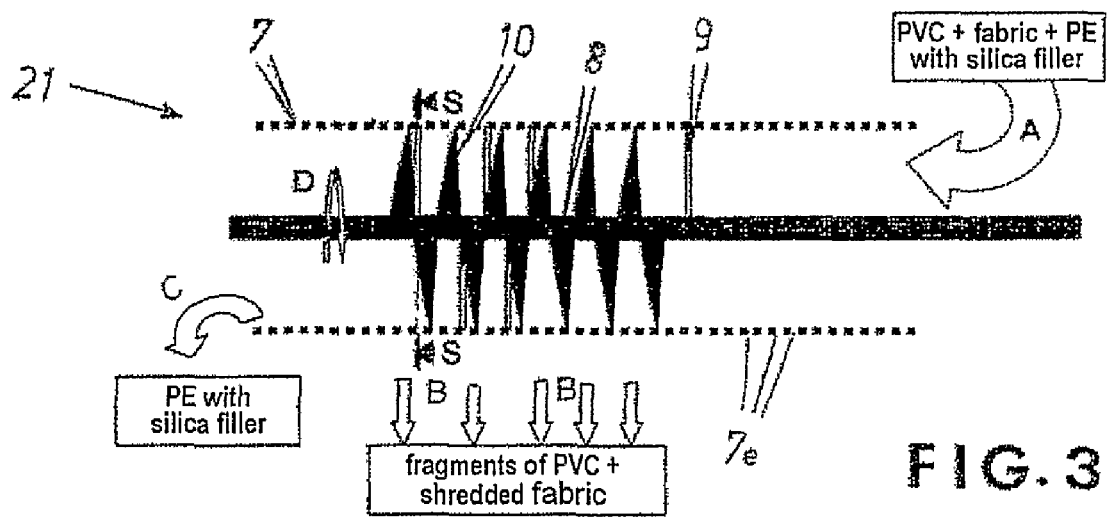

A more detailed description of a preferred embodiment of the process according to the invention will now be provided with reference to the appended drawings, in which:

FIG. 1 is a diagrammatical representation of equipment for separating the granular parts of the plastics within the processing environment according to the invention, FIG. 2 is a diagrammatical transverse cross section of the apparatus for separating out heavy plastics materials such as PVC, fabrics and polyethylene with silica filler, FIG. 3 is a diagrammatical representation of a lateral view of the apparatus in FIG. 2.

The following operations are performed in the abovementioned embodiment of the process according to the invention:

a) Washing of the heavy plastics to remove the lead compounds,
b) Separation of the plastics from the wash solution,
c) Lead recovery and regeneration of the wash solution,
d) Rinsing of the plastics,
e) Drying of the plastics,
f) Separation of granular plastics from light plastics through drawing in an air flow making use of the shape effect (polyethylene with silica filler, PVC, fabrics),
g) Separation of the PVC and fabrics from polyethylene with silica filler through fragmentation,
h) Pyrolysis of the polyethylene with silica filler,
i) Cracking of the pyrolysis gases and vapours in order to reduce their molecular weight and make them more convenient for handling and combustion to provide the heat necessary for pyrolysis,
j) Oxidation of the pyrolysis residue to remove carbonaceous residues and recovery of silica,
k) Pyrolysis of the PVC and fabrics mixture in the presence of alkaline substances,
l) Oxidation of the residue from the pyrolysis of PVC and fabrics with the production of inert ashes.

The first operation of removing lead compounds from plastics materials is carried out by washing with aqueous solutions containing compounds capable of dissolving lead (II) compounds, oxide and sulphate, while in order to dissolve lead (IV) oxide substances which are reducing with respect to this compound such as hydrogen peroxide or sulphites must be added to the solution in such a way as to bring it into oxidation stage (II) and render it soluble in the aqueous solutions of the compounds used. The treatment of washing the plastics or other substances may be carried out at a temperature between ambient temperature and the boiling point of the solution. The dissolution reaction is faster the higher the temperature and the more vigorous the stirring of the plastics materials in solution.

The second filtration operation is carried out using physical separation methods widely used in the industry.

The third operation, regeneration of the spent wash solution to remove the lead compounds present in it is carried out for example by treating the solution with alkali metal or alkaline earth metal sulphides (for example sodium or calcium sulphide) so as to separate lead as the sulphide, which is very poorly soluble, or treating the solution with metals which are less noble than lead, such as for example metallic zinc or iron, making use of the cementation reaction and replacing the lead in solution by cations of these metals.

After they have been freed from lead compounds the plastics are dried in a flow of air before being subjected to the separation process.

The process for the separation of heavy plastics materials results in various fractions: granular plastics materials, plastics materials based on PVC, plastics materials in the form of fabrics, plastics materials in the form of thin films comprising polyethylene with quality silica filler.

The new process effects separation into different fractions by making use of the shape effect and the varying brittleness of the materials. For this purpose the mixture of plastics materials is placed in an air flow: as will be better illustrated below the materials with a high surface area/mass ratio are carried over leaving behind those with a lower ratio. Two fractions are obtained in this way: a heavy fraction essentially comprising materials of relatively large thickness originating from the breaking up of the battery containers, and a light fraction containing all the other materials: PVC, fabrics, polyethylene diagrams with silica filler. The heavy fraction may be recycled as such without any further treatment, while the light fraction is sent to another separation process which will also be better described below, which makes use of the differing brittleness of the materials. For this purpose the plastics are placed in an apparatus comprising a perforated cylinder and a rotating axis moving a number of spikes of rubber or other suitable material which scrape the inner surface of the cylinder. The mixture of plastics materials is subjected to compression, flexion, traction and torsion treatment within this cylinder. The PVC in the mixture is a brittle material, as a result of which it breaks up and passes out through the holes, while fabrics are frayed and reduced to dust and also escape to the outside of the cylinder. The PE diaphragms with silica filler are instead very plastic and elastic and withstand this treatment virtually unharmed. The subsequent recovery of silica from the diaphragms containing it as filler is based on the initial pyrolysis (heating in the absence of oxygen) of these diaphragms to a temperature of between 300 and 600° C., preferably between 470 and 530° C. for a time of between 10 and 60 minutes, preferably between 20 and 45 minutes, in order to decompose most of the organic fraction present and convert it into gaseous products which are extracted and passed to a catalytic cracking reactor to reduce their molecular weight. Acid zeolytes of the faujasite or Y zeolites family are used as catalysts. The cracking reactor is kept at between 550 and 750° C., and the cracking products are fed to the combustion chamber in which they are successively burnt to produce the heat necessary for the entire process.

After this treatment a solid fraction essentially comprising silica and a carbon residue amounting to 3-5% of the total remains in the furnace. The carbon residue is oxidized in a separate process carried out under controlled temperature conditions between 400 and 600° C., preferably between 450 and 500° C., in the presence of a gaseous mixture comprising an inert gas (nitrogen, carbon dioxide, argon) and oxygen in a percentage of between 3 and 7%. Only by operating under these conditions is it possible to burn off the carbon residues without giving rise to any local increases in temperature which cause the silica present to sinter, with a reduction in surface area and loss of value of the final product.

Apart from the operating procedures used in the pyrolysis and oxidation process, the quality of the silica obtained also depends on the quantity of foreign plastics materials in the separators based on polyethylene with silica filler which are subjected to the pyrolysis process and the quantity of residual lead compounds present in the plastics. After the pyrolysis and oxidation process, the foreign plastics in fact leave an inert residue essentially comprising quartz and calcium sulphate with zero surface areas. The presence of this inert residue reduces the quality of the microporous silica recovered from the polyethylene-based separators because it dilutes the final product. If lead compounds (i.e. (II) and (IV) oxides, sulphate) are present, these compounds may react with the silica and form yellow-coloured lead silicates with a zero surface area. Again in this case there is a marked reduction in the surface area, apart from colouration of the final product. An object of this patent is therefore also new processes which make it possible to remove lead compounds from the plastics and separate the mixture of plastics materials into different fractions.

As far as the abovementioned operation of separating granular plastics from light plastics (described in item f in the list of operations in the process) is concerned, this may be carried out as follows: the mixture of plastics materials 1 (see FIG. 1) is conveyed on a conveyor belt 2 (the direction of movement of which is indicated by arrows E) towards a suction aperture 3 which is designed in such a way that the negative pressure generated by it is sufficient to lift only those fragments having a high surface area/mass ratio (those made of PVC, fabric, PE with silica filler), sucking them up into a conduit 6, delivering them to a suitable hopper 4. Fragments 5 of materials of relatively large thickness originating from the breaking up of the battery containers are not sucked up, and remain or fall back onto conveyor belt 2 after a short trajectory, and the latter delivers them (towards the right in the drawing) to a station, not shown, where they accumulate and are cyclically picked up for delivery to their final destination.

With regard to the operation described in item g of the aforesaid list, that is the separation of PVC and fabrics from the polyethylene with silica filler, this is carried out starting from the fragments 5 of relatively light materials described above which are conveyed to hopper 4 in FIG. 1. These fragments, which have different degrees of brittleness depending upon the materials of which they are made, are sent to apparatus 21 shown in FIGS. 2, 3 which essentially comprises a perforated cylinder 7, through which they pass in a longitudinal direction, containing a coaxial rotating shaft 8 which draws a plurality of blades 9 (FIG. 2) of rubber or material having equivalent characteristics scrape the inner surface of perforated cylinder 7, scraping them up.

A number of spikes 10 of hard rubber or similar material also extend in a radial direction from the walls of rotating shaft 8, the free ends of which also scrape the surface of cylinder 7, their points of attachment on rotating shaft 8 describing a line of helical shape.

Arrow A indicates the direction in which the combination of fragments are fed before they are separated, and arrow D indicates the direction of rotation of rotating shaft 8. After the abovementioned composite fracturing stress the PVC present in the mixture, which is more brittle, is broken up into fine pieces and escapes radially from cylinder 7 through holes 7e, as do the fabrics, which are shredded and reduced to dust.

Separators or diaphragms of polyethylene with silica filler survive the abovementioned treatment unharmed, as they are instead very elastic and plastic, becoming deposited at the bottom of perforated cylinder 7 and are delivered outward in an axial direction (arrow C).

A practical embodiment of the process according to the invention will now be described: a mixture of 100 kg of heavy plastics materials obtained from the process of breaking up spent lead-acid batteries was treated at a temperature of 60° C. with 200 liters of a solution containing 300 g/l of sodium acetate corrected to pH 5.5 through the addition of acetic acid. 35% hydrogen peroxide was added to the solution to reduce the lead (IV) oxide. The mass was stirred for 30 minutes; after treatment the plastics materials were separated out by filtration and the solution was regenerated by treatment with metallic zinc in granules in order to selectively cement the lead (II) ions onto the zinc and replace them by zinc ions in solution. The plastics were rinsed with water, dried in a flow of hot air and subjected to a separation process based on the shape effect. For this purpose the plastics materials were placed on a vibrating conveyor belt comprising a metal mesh so that air would pass through it and were kept agitated through vibration of the belt. They were caused to pass beneath a conduit in which suction was maintained. The light plastics (flakes of polyethylene with silica filler, flakes of PVC and fabrics) were drawn up by the flow of air while the plastics having a greater surface area/mass ratio remained on the conveyor belt. The plastics drawn up by the air flow were stopped in a cyclone separator and fed to apparatus comprising a perforated cylinder and a rotating shaft bearing many arms of rubber or other suitable material which scraped the inner surface of the cylinder. At the end of the separation treatment 50 kg of diaphragms comprising polyethylene with silica filler were recovered with a separation yield of approximately 80%. The PVC content of this fraction was less than 0.1%. The remaining polyethylene with silica filler was mixed with PVC and the textile fraction. The diaphragms comprising polyethylene with silica filler were pyrolysed at 500° C. with a contact time of 30 minutes in apparatus comprising a rotating drum externally heated with hot combustion gases. Within the rotating cylinder there were suitable blades which mixed the material during rotation. An inert atmosphere was maintained within the cylinder through a flow of nitrogen kept at a slight excess pressure in relation to atmosphere. The pyrolysis gases and vapours were caused to pass through a catalytic cracking reactor filled with an acid zeolite of the family of Y zeolites held at 650° C. and subsequently passed to the combustion chamber. Once the pyrolysis reaction was complete, and maintaining the same temperature, the atmosphere in the furnace was replaced by a flow of nitrogen containing 5% oxygen in order to oxidize the carbonaceous residue deposited on the silica. The treatment in an oxidising environment was continued for 35 minutes, the time required to remove all the carbon present. Finally, 30 kg of white-coloured silica having a surface area of 148 m$^2$/g, wholly similar to the starting silica used to form the separators, was recovered.

The invention claimed is:

1. Process for recovery of the silica present in the separators located between the elements of lead-acid batteries, characterized in that it comprises the following operations:
    a) washing heavy plastics to remove the lead compounds and other foreign bodies,
    b) separating the heavy plastics from a washing solution,
    c) lead recovery and regeneration of the washing solution,
    d) rinsing of the heavy plastics,
    e) drying of the heavy plastics,
    f) separation of granular plastics from thin plastics, the latter including polyethylene with silica filler, PVC, and fabrics,
    g) separation of the PVC and fabrics from the polyethylene with silica filler through fragmentation,
    h) pyrolysis of the polyethylene with silica filler,
    i) cracking of the pyrolysis gases and vapours in order to reduce their molecular weight and render them more suitable for handling and combustion to provide the heat necessary for pyrolysis,
    j) oxidation of the pyrolysis residue to remove carbonaceous residues and recover the silica,
    k) pyrolysis of the mixture of PVC and fabrics in the presence of alkaline substances, and
    l) oxidation of the residue from the pyrolysis of PVC and fabrics with the production of inert ashes.

2. Process according to claim 1, in which the heavy plastics are washed with an aqueous solution containing compounds capable of dissolving the lead (II) compounds and substances capable of reducing lead (IV) to lead (II) at a temperature between ambient temperature and the boiling point.

3. Process according to claim 1 in which the spent washing solution is regenerated by treating it with alkali metal or alkaline earth sulphides or by treating it with metals which are less noble than lead exploiting the cementation reaction which replaces the lead in solution with cations of these metals.

4. Process according to claim 1 in which the granular plastics are separated from the thin plastics by drawing up in a flow of air exploiting a shape effect.

5. Process according to claim 1 in which the polyethylene is separated from the PVC and fabrics by exploiting a lesser brittleness of polyethylene in comparison with the other materials in a machine comprising a perforated cylinder in which numerous arms of rubber or other suitable material rotate scraping the inner surface of the cylinder.

6. Process according to claim 1 in which the polyethylene with quality silica filler is pyrolysed for a time of between 10 and 60 minutes at a temperature of between 300° C. and 600° C. and in which the pyrolysis gases and vapours are caused to pass to a catalytic cracking reactor.

7. Process according to claim 1 in which the pyrolysis residue is oxidized under controlled temperature conditions between 400° C. and 600° C. in the presence of a gaseous mixture comprising an inert gas and oxygen in a percentage of between 3% and 7%.

8. Process according to claim 2 in which the spent washing solution is regenerated by treating it with alkali metal or alkaline earth sulphides or by treating it with metals which are less noble than lead making use of the cementation reaction which replaces the lead in solution with cations of these metals.

9. Process according to claim 2 in which the granular plastics are separated from the thin plastics by drawing up in a flow of air exploiting a shape effect.

10. Process according to claim 3 in which the granular plastics are separated from the thin plastics by drawing up in a flow of air exploiting a shape effect.

11. Process according to claim 2 in which the polyethylene is separated from the PVC and fabrics by exploiting a lesser brittleness of polyethylene in comparison with the other materials in a machine comprising a perforated cylinder in which numerous arms of rubber or other suitable material rotate scraping the inner surface of the cylinder.

12. Process according to claim 3 in which the polyethylene is separated from the PVC and fabrics by exploiting a lesser brittleness of polyethylene in comparison with the other materials in a machine comprising a perforated cylinder in which numerous arms of rubber or other suitable material rotate scraping the inner surface of the cylinder.

13. Process according to claim 4 in which the polyethylene is separated from the PVC and fabrics by exploiting a lesser brittleness of polyethylene in comparison with the other materials in a machine comprising a perforated cylinder in which numerous arms of rubber or other suitable material rotate scraping the inner surface of the cylinder.

14. Process according to claim 2 in which the polyethylene with quality silica filler is pyrolysed for a time of between 10 and 60 minutes at a temperature of between 300° C. and 600° C. and in which the pyrolysis gases and vapours are caused to pass to a catalytic cracking reactor.

15. Process according to claim 3 in which the polyethylene with quality silica filler is pyrolysed for a time of between 10 and 60 minutes at a temperature of between 300° C. and 600° C. and in which the pyrolysis gases and vapours are caused to pass to a catalytic cracking reactor.

16. Process according to claim 4 in which the polyethylene with quality silica filler is pyrolysed for a time of between 10 and 60 minutes at a temperature of between 300° C. and 600° C. and in which the pyrolysis gases and vapours are caused to pass to a catalytic cracking reactor.

17. Process according to claim 5 in which the polyethylene with quality silica filler is pyrolysed for a time of between 10 and 60 minutes at a temperature of between 300° C. and 600° C. and in which the pyrolysis gases and vapours are caused to pass to a catalytic cracking reactor.

18. Process according to claim 2 in which the pyrolysis residue is oxidized under controlled temperature conditions between 400° C. and 600° C. in the presence of a gaseous mixture comprising an inert gas and oxygen in a percentage of between 3% and 7%.

19. Process according to claim 3 in which the pyrolysis residue is oxidized under controlled temperature conditions between 400° C. and 600° C. in the presence of a gaseous mixture comprising an inert gas and oxygen in a percentage of between 3% and 7%.

20. Process according to claim 4 in which the pyrolysis residue is oxidized under controlled temperature conditions between 400° C. and 600° C. in the presence of a gaseous mixture comprising an inert gas and oxygen in a percentage of between 3% and 7%.

* * * * *